March 17, 1931.  K. FASSNACHT  1,796,362
ORNAMENTAL CHAIN
Filed July 18, 1929
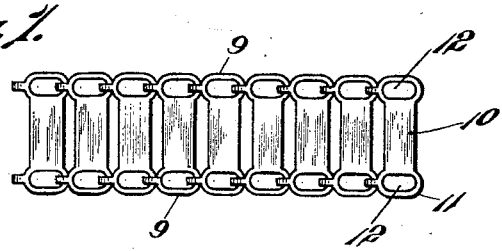
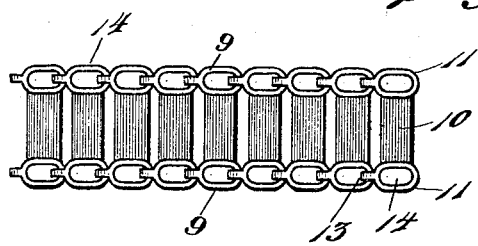
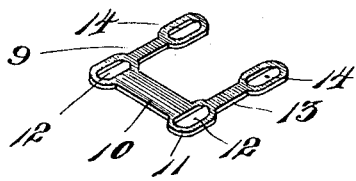
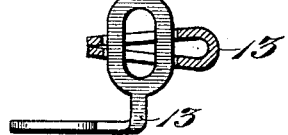
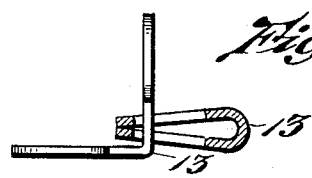
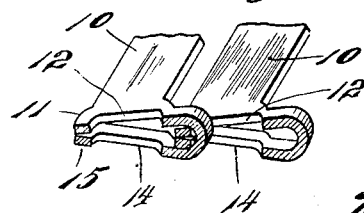
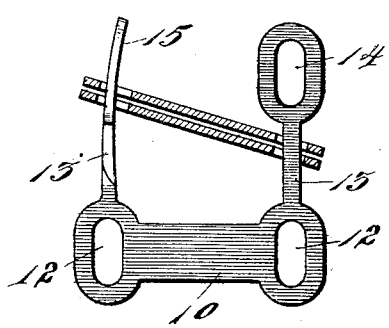
INVENTOR.
Karl Fassnacht
BY Barlow & Barlow
ATTORNEYS.

Patented Mar. 17, 1931

1,796,362

UNITED STATES PATENT OFFICE

KARL FASSNACHT, OF PROVIDENCE, RHODE ISLAND, ASSIGNOR TO SPEIDEL CHAIN CO., OF PROVIDENCE, RHODE ISLAND, A FIRM COMPOSED OF FREDERIC SPEIDEL AND EUGEN SPEIDEL, BOTH OF PFORZHEIM, GERMANY

ORNAMENTAL CHAIN

Application filed July 18, 1929. Serial No. 379,221.

This invention relates to an improved construction of band chain and has for its object to provide a band having link chains along its opposite edges, the links of the opposite chains being each formed of a short length of stock folded upon itself and slotted at one or both ends, each link having a portion extending through the corresponding slot of the next adjacent link member to loosely connect the links together, the two chains being spaced apart and connected together by a series of cross bars extending between them.

A further object of the invention is to form a chain band of sheet metal having link chains along its opposite edges connected by cross bars, and to in some cases form the cross bar as a part of each pair of links in the opposite chains, in which case the opposite ends of these cross bars are slotted, and the bar is provided with a lateral extension part forming another portion of the chain link which part is adapted to be threaded through the slot of the next adjacent link and be folded back upon itself to lock the links together.

With these and other objects in view, the invention consists of certain novel features of construction, as will be more fully described, and particularly pointed out in the appended claims.

In the accompanying drawings:

Fig. 1 is a front view of a short section of my improved chain.

Fig. 2 is a rear view of a short section of my improved chain.

Fig. 3 shows one of the links of the chain in extended position with a cross bar or plate as connecting the opposite link portions.

Fig. 4 is a view partly in section showing one part of one link portion as twisted at right angles to that of the other part of the link to facilitate its being passed through the slots of the next adjacent link.

Fig. 5 is the same as Fig. 4 with the twisted portion of the link as having been passed through the eyes of the next link and then twisted back into its original plane.

Fig. 6 is a front view of the links illustrated in Fig. 4 showing one portion of one of the links as twisted to a plane at right angles to that of the other portion of this link.

Fig. 7 is a perspective view illustrating the slotted members of the link as being folded back upon themselves and the connecting or neck portion of the link as extending through the corresponding slot of the next adjacent link.

It is found in the construction of a broad or band type of chain of advantage to form the link members of this chain from sheet stock, the band being formed of two series of edge links each link being formed of a strip of flat stock slotted at its ends and threaded through the slots at the ends of the next adjacent link and then folded back upon itself to cause its slots to register one with the other. The two series of edge links being maintained in spaced relation by a series of cross bars or plates extending between them. In some instances the cross bar is caused to form one end portion of the edge link members and is slotted at its ends and is provided with laterally extending connecting link portions which are threaded through the eyes of the next adjacent links and folded back upon themselves to loosely secure these links together, thereby forming a chain band with cross plates or bars which may present a broad surface adapted to be ornamented in any desired way to present a handsome and attractive appearance to the band, and the following is a detailed description of the present embodiment of my invention and showing one construction of chain links and band by which these advantageous results may be accomplished.

With reference to the drawings each of the links of this chain is herein shown as being formed with an integral cross bar 10 which may extend the full width of the band and form a part of the connecting links if desired, in which case the ends of this bar if desired may be slightly enlarged as at 11 to form a part of the edge link portions, and these enlarged portions are slotted as at 12 lengthwise of the chain. Each of these enlarged end portions is shown as being provided with a connecting extension link member 13 which also has an elongated slot 14 at its free end. This free end of these link extensions are adapted to be passed or threaded through the slots of the next adjacent link members as best illustrated in Fig. 4 to accomplish which, this threading action, where the cross bar is permanently attached to the edge link portion, the free end portion of one of these extensions must be twisted at right angles to that of its opposite end as illustrated at 15 in Figs. 4 and 6. After this end has been passed through these slots of the next adjacent link it is twisted back into its original plane and then folded upon itself causing the slots 12 and 14 to register one with the other as best illustrated in Fig. 7.

I have herein shown the cross bar 10 as being formed integral with the two spaced series of interengaging link members to form a band, but I do not wish to be restricted to forming this cross bar integral with these end members as these bars may in some instances be otherwise connected to these link members if desired.

My improved chain is very handsome and attractive in appearance, may be constructed without solder, and is very flexible, and by employing broad faced cross bars or plates the same may be ornamented to produce a great variety of design effects.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a chain band two spaced series of connected link members extending along each edge of the band, each of said link members being formed of a strip of sheet stock slotted at its ends and folded upon itself with its said slots registering with each other, the strip at its fold extending through the corresponding slots of the next adjacent link members to loosely connect the link members together along opposite edges of the band, and spacing cross bars extending between said series of edge link members to maintain the two link series in the desired spaced relation.

2. In a sheet metal chain, a link member comprising a cross bar slotted at its opposite ends, shank members each slotted at its free end extending from the edge of said bar and adapted to be threaded through the corresponding slots of the next adjacent link and folded back upon itself causing its slot to register with that of said cross bar to receive the shank of the next link to be connected.

3. A chain having a series of link members each formed with a cross bar slotted at its ends, foldable members extending from each of said bars slotted adjacent its free end and threaded through the corresponding slots in the next adjacent link and folded back upon itself with its slot registering with the corresponding slot of the cross bar.

In testimony whereof I affix my signature.

KARL FASSNACHT.